United States Patent [19]

Seko

[11] 4,357,218

[45] * Nov. 2, 1982

[54] CATION EXCHANGE MEMBRANE AND USE THEREOF IN THE ELECTROLYSIS OF SODIUM CHLORIDE

[75] Inventor: Maomi Seko, Tokyo, Japan

[73] Assignee: Asahi Kasei Kogyo Kabushiki Kaisha, Osaka, Japan

[*] Notice: The portion of the term of this patent subsequent to Dec. 11, 1996, has been disclaimed.

[21] Appl. No.: 214,876

[22] Filed: Dec. 10, 1980

Related U.S. Application Data

[60] Division of Ser. No. 836,417, Sep. 26, 1977, which is a continuation-in-part of Ser. No. 745,196, Nov. 26, 1976, abandoned, which is a continuation of Ser. No. 556,288, Mar. 7, 1975, abandoned.

[30] Foreign Application Priority Data

Mar. 7, 1974 [JP] Japan .................................. 49-25718

[51] Int. Cl.$^3$ ........................... C25B 1/34; C25B 9/00; C25B 13/02; C25B 13/08
[52] U.S. Cl. ...................................... 204/98; 204/128; 204/252; 204/296
[58] Field of Search ................... 204/98, 128, 296, 252

[56] References Cited

U.S. PATENT DOCUMENTS

| | | |
|---|---|---|
| B 361,744 | 1/1975 | Gritzner . |
| 2,636,851 | 4/1953 | Juda et al. . |
| 2,681,320 | 6/1954 | Bodamer . |
| 2,827,426 | 3/1958 | Bodamer . |
| 2,967,807 | 1/1961 | Osborne et al. . |
| 2,978,393 | 4/1961 | Hoch et al. . |
| 2,978,401 | 4/1961 | Hoch et al. . |
| 2,978,402 | 4/1961 | Hoch et al. . |
| 3,017,338 | 1/1962 | Butler, Jr. et al. . |
| 3,022,244 | 2/1962 | Blanc et al. . |
| 3,041,317 | 6/1962 | Gibbs et al. . |
| 3,135,673 | 6/1964 | Tirrell et al. . |
| 3,153,673 | 10/1964 | Roming, Jr. . |
| 3,163,599 | 12/1964 | Salutsky et al. . |
| 3,222,267 | 12/1965 | Tirrell et al. . |
| 3,247,133 | 4/1966 | Chen . |
| 3,257,334 | 6/1966 | Chen et al. . |
| 3,282,875 | 11/1966 | Connolly et al. . |
| 3,301,893 | 1/1967 | Putnam et al. . |
| 3,337,443 | 8/1967 | Raetzsch et al. . |
| 3,341,366 | 9/1967 | Hodgdon, Jr. et al. . |
| 3,388,080 | 6/1968 | Körost et al. ................... 204/296 |
| 3,397,191 | 8/1968 | Beckerbauer . |
| 3,496,077 | 2/1970 | Cooper . |
| 3,506,635 | 4/1970 | Anderson . |
| 3,510,417 | 5/1970 | Mizutani et al. . |
| 3,546,186 | 12/1970 | Gladding et al. . |
| 3,560,568 | 2/1971 | Resnick . |
| 3,624,053 | 11/1971 | Gibbs et al. . |
| 3,657,104 | 4/1972 | Hodgdon, Jr. . |
| 3,663,414 | 5/1972 | Martinsons et al. . |
| 3,674,753 | 7/1972 | Uraneck et al. . |
| 3,684,543 | 8/1972 | de Nora et al. . |
| 3,684,747 | 8/1972 | Coalson et al. . |
| 3,692,569 | 9/1972 | Grot . |
| 3,694,281 | 9/1972 | Leduc . |
| 3,718,551 | 2/1973 | Martinsons . |
| 3,718,627 | 2/1973 | Grot . |
| 3,773,634 | 11/1973 | Stacey et al. . |
| 3,784,399 | 1/1974 | Grot . |
| 3,793,163 | 2/1974 | Dotson . |
| 3,839,172 | 10/1974 | Chapiro et al. . |
| 3,849,243 | 11/1974 | Grot . |
| 3,853,720 | 12/1974 | Korach et al. . |
| 3,853,721 | 12/1974 | Darlington et al. . |
| 3,864,226 | 2/1975 | Spitzer . |
| 3,878,072 | 4/1975 | Cook, Jr. et al. . |
| 3,884,777 | 5/1975 | Harke et al. . |
| 3,887,499 | 6/1975 | Hodgdon, Jr. . |
| 3,904,496 | 9/1975 | Harke et al. . |
| 3,948,737 | 4/1976 | Cook Jr. et al. . |
| 3,969,285 | 7/1976 | Grot . |
| 4,012,324 | 3/1977 | Gregor . |
| 4,025,405 | 5/1977 | Dotson et al. . |
| 4,030,988 | 6/1977 | Grot . |
| 4,035,254 | 7/1977 | Gritzner . |
| 4,060,465 | 11/1977 | Yokota et al. . |
| 4,060,473 | 11/1977 | Giaffre et al. . |
| 4,065,366 | 12/1977 | Oda et al. . |
| 4,080,270 | 3/1978 | O'Leary et al. . |
| 4,113,585 | 9/1978 | Resnick et al. . |
| 4,123,336 | 10/1978 | Seko et al. ........................ 204/98 |
| 4,166,014 | 8/1979 | Sata et al. . |
| 4,169,023 | 9/1979 | Sata et al. . |
| 4,176,022 | 11/1979 | Darlington . |
| 4,178,218 | 12/1979 | Seko ................................. 204/98 |
| 4,192,725 | 3/1980 | Dotson et al. . |
| 4,202,743 | 5/1980 | Oda et al. . |
| 4,215,009 | 7/1980 | Spaziante et al. . |
| 4,224,121 | 9/1980 | Dempsey et al. . |

FOREIGN PATENT DOCUMENTS

| | | |
|---|---|---|
| 570269 | 2/1959 | Canada . |
| 771140 | 11/1967 | Canada . |
| 89244 | 4/1972 | Fed. Rep. of Germany . |
| 2021289 | 6/1970 | France . |
| 59777 | 1/1968 | German Democratic Rep. . |
| 93990 | 11/1972 | German Democratic Rep. . |
| 39-11603 | 6/1964 | Japan . |
| 46-323361 | 5/1971 | Japan . |
| 48-14572 | 2/1973 | Japan . |
| 51-86100 | 7/1976 | Japan . |
| 68/7482 | 5/1969 | South Africa . |
| 1184321 | 3/1970 | United Kingdom . |
| 1195871 | 6/1970 | United Kingdom . |
| 1199952 | 7/1970 | United Kingdom . |
| 1273164 | 5/1972 | United Kingdom . |
| 2009795 | 6/1979 | United Kingdom . |

OTHER PUBLICATIONS

Exhibit A, "Commercial Operation of the Ion Exchange Membrane Chlor-Alkali Process", Maomi Seko, Apr. 4-9, 1976.

Exhibit B, "Product R & D", Maomi Seko.

Necessary pages of the Text entitled "Material for Society for Research of Soda Industry and Technology", 1973.

"Rogers' Industrial Chemistry", C. C. Furnas.

"Sodium Chloride, The Production and Properties of Salt and Brine", Dale W. Kaufmann.

"Inorganic Process Industries", Kenneth A. Kobe, 1948.

"Hypochlorite Generator for Treatment of Combined Sewer Overflows", U.S. Environmental Protection Agency.

"Materials Engineering and Sciences Division Biennial Conference", Feb. 15-18, 1970, Am. Inst. of Chem. Eng.

"News Product Information from Research & Development Division-Plastics Department", E. I. Du Pont de Nemours & Co., 10/1/69.

"Chloromat-On Site Generation of Hypochlorite", S. A. Michalek and F. B. Leitz.

Analytical Chemistry, vol. 7 (1958).

"Instructions on SATE Scientific-Technical Examination of Inventions", Moscow, TZNIIPI (1975).

The Canadian Journal of Chem. Eng., Jun. 1963, pp. 91-94.

Journal of the Electrochemical Soc., Feb., 1957, vol. 104, No. 2, pp. 111-115.

BGH-Entscheidung, "Cholinsalycilat", GRUR 1974, p. 332.

"Polymer Preprints", Div. of Polymer Chemistry, American Chem. Soc., vol. 12, p. 512.

Article entitled "Application of Ion Exchange Resin Membrane" in the Magazine entitled Industrial Waste Water and High Molecule, vol. 17 (1968).

"Ion Exchange Resin Membrane", 1963.

"Electrochemistry⇌, vol. 34 (1966).

*Primary Examiner*—R. L. Andrews
*Attorney, Agent, or Firm*—Birch, Stewart, Kolasch & Birch

[57] ABSTRACT

Cation exchange membranes characterized by carboxylic or carboxylic and sulfonic acid groups pendant from a fluorocarbon polymer are utilized for the electrolysis of aqueous sodium chloride.

68 Claims, No Drawings

CATION EXCHANGE MEMBRANE AND USE THEREOF IN THE ELECTROLYSIS OF SODIUM CHLORIDE

RELATED APPLICATIONS

This application is a division of copending application Ser. No. 836,417, filed on Sept. 26, 1977, which is a continuation-in-part of application Ser. No. 745,196, filed on Nov. 26, 1976, now abandoned, which is, in turn, a continuation of application Ser. No. 556,288, filed on Mar. 7, 1975, now abandoned. Application Ser. No. 959,312, a divisional of said application Ser. No. 836,417, issued as U.S. Pat. No. 4,178,218 on Dec. 11, 1979.

BACKGROUND OF THE INVENTION

A large proportion of chlorine and caustic produced throughout the world is manufactured in diaphragm type electrolytic cells wherein the opposed anode and cathode are separated by a fluid permeable diaphragm which may be of asbestos, a polymer film or a polymer film supported on asbestos. The diaphragm defines separate anolyte and catholyte compartments. Chlorine is produced in the former, aqueous sodium hydroxide in the latter.

In operation, brine, preferably saturated, is fed to the anolyte compartment. The brine passes through the diaphragm into the catholyte compartment where an aqueous sodium hydroxide solution of about 11 to 18 percent is produced. This solution is contaminated by sodium chloride which must be separated. After separation, the caustic solution is concentrated to produce the commercial product.

The permionic exchange membrane type electrolytic cell has been utilized as an improvement over the diaphragm type. The permionic membrane replaces the diaphragm, and is characteristically different from it since, in contrast to the diaphragm, it is substantially impervious to water and to sodium chloride. The exchange membrane selected for the production of chlorine and caustic is usually a cation exchange membrane which permits the passage of sodium ions into the catholyte, but prevents back-migration of OH ions into the anolyte. As a result, relatively pure caustic substantially free of sodium chloride is produced in the catholyte, and high grade chlorine is produced at the anode.

A number of cation exchange membranes are known.

U.S. Pat. Nos. 3,887,499 and 3,657,104 describe permselective cation exchange membranes comprising a hydrocarbon polymer backbone with pendant carboxylic and sulfonic groups.

U.S. Pat. No. 3,878,072 describes cation exchange membranes which are hydrolyzed copolymers of a perfluorinated hydrocarbon and either a fluorosulfonated perfluorovinyl ether or a sulfostyrenated perfluorinated ethylene propylene polymer. In either event, the characteristic feature of the membrane is the sulfonyl group as the only functional group.

U.S. Pat. No. 3,853,721 which issued on Dec. 10, 1974 describes asbestos diaphragms containing from about 0.01 to 22 weight percent, based on the weight of the diaphragm, of an ion exchange resin which is a fluorocarbon polymer characterized by the presence of the following groups:

sulfonic—$SO_3H$
fluoromethylene sulfonic—$CF_2SO_3H$
benzene sulfonic—$\phi SO_3H$
chloromethylene sulfonic—$CCl_2SO_3H$
carboxylic—$COOH$
phosphoric—$PO_3H_2$
phosphorous—$PO_2H_2$
phenolic—$\phi OH$ A characteristic feature of these diaphragms is that they are gas and electrolyte permeable in contrast to permionic membranes, such as the cationic ion exchange membranes of this invention which are substantially impermeable to electrolytes, but permit the passage of ions. Another feature, according to the patent, is that they have a resistance voltage drop across the diaphragm of as much as 0.2 to 0.3 volt less than an untreated asbestos diaphragm of the same thickness.

A problem with the use of diaphragm electrolysis, as pointed out above, is that the permeability of the diaphragm to sodium chloride results in accumulation of this material in the catholyte. This concentration may be as high as 17%. When attempts are made to produce concentrated solutions of sodium hydroxide in the catholyte by evaporation of water, it is necessary to use an expensive apparatus as well as a large amount of energy.

U.S. Pat. No. 3,301,893 discloses certain fluorocarbon ethers containing both carboxyl and sulfonyl groups. The products of this patent, however, are of such low molecular weight that they cannot be utilized for the preparation of cation exchange membranes.

THE INVENTION

It has now been discovered that many of the difficulties of the prior art can be minimized or completely avoided by the utilization of permselective cation ion exchange membranes in which carboxylic acid groups or both carboxylic and sulfonic acid groups are pendant from a fluorocarbon polymer.

Membranes of this type manifest a number of significant advantages. Those characterized by the presence of carboxyl groups manifest:

1. Decreased back-migration of hydroxyl ions.
2. Increased current efficiency at high current density even when the concentration of sodium hydroxide in the catholyte is high.
3. Increased purity of the sodium hydroxide solution produced in the cathode because of the resistance of the membrane to permeation by sodium chloride.
4. Increased purity of chlorine produced at the anode.
5. Resistance to oxidation.

Those membranes which have both carboxylic and sulfonic groups are much preferred embodiments of this invention. They exhibit all of the above advantages and, in addition:

1. Their useful life in operation is surprisingly long.
2. Power consumption in units in which they are employed is surprisingly low.

The membranes of this invention are prepared from fluorocarbon polymers with pendant carboxylic acid groups, or pendant carboxylic acid and sulfonic acid groups. The pendant groups may be chemically bonded to the fluorocarbon polymer. Alternatively, they may become integral with the polymer by impregnation and coating techniques followed by polymerization as described more fully hereinafter. Since membranes prepared by both procedures are functional equivalents, they will be described in the specification and claims as fluorocarbon polymer membranes having pendant carboxyl groups, or pendant carboxyl and sulfonic groups. Often the polymers will be crosslinked to increase resistant to solvent and temperature under electrolysis conditions. Many linear polymers, however, are completely satisfactory. For example, a crosslinking agent such as divinyl benzene may be added to a monomer mixture used to impregnate or coat a fluorocarbon membrane. Upon completion of polymerization, the dimensional stability of the membrane may be greatly improved.

As mentioned above, the carboxylic acid groups may be bonded chemically to the fluorocarbon polymer. Alternatively, a polymer having carboxylic acid groups may be combined physically with the fluorocarbon polymer. In the latter case, the polymer having carboxylic acid groups may be dispersed uniformly throughout the fluorocarbon matrix or it may be present in layers on the fluorocarbon polymer. Such products may be prepared by coating or impregnating a fluorocarbon polymer membrane which may or may not have sulfonic acid groups with a carboxylic acid group-containing monomer and, thereafter, effecting polymerization.

As mentioned above, when both sulfonic acid and carboxylic acid groups are present on the membrane, it will have high electric conductivity, with a resulting decrease in power cost and increasing commercial advantages. The advantages are especially apparent when the ratio of carboxylic acid groups to sulfonic acid groups is from 1:100 to 100:1.

When practicing this invention, the acid groups may be either in the form of free acid or metal salts.

The cation exchange membrane of this invention wherein the acid groups are directly attached to the base fluorocarbon polymer may be prepared as follows:

1. A membrane made from a polymer produced by polymerizing a vinyl ether of the general formula:

$$CF_2=CF-O-(CF_2)_n-X$$

(wherein n is an integer of 2 to 12, preferably 2 to 4; and X is —CN, —COF, —COOH, —COOR, —COOM or —CONR$_2$R$_3$, where R is an alkyl group containing 1 to 10, preferably 1 to 3, carbon atoms; R$_2$ and R$_3$ are individually hydrogen or one of the groups represented by R; and M is sodium, potassium or cesium) with tetrafluoroethylene and/or $CF_2=CF-O-R_f$ (wherein R$_f$ is a perfluorinated alkyl group containing 1 to 3 carbon atoms), and hydrolyzing the polymer where necessary to form acid groups;

2. A polymer membrane made by polymerizing a perfluoroacrylic monomer represented by the general formula:

$$CF_2=CFCOZ$$

(wherein Z is fluorine or an alkoxy group containing 1 to 10, preferably 1 to 3 carbon atoms, amino or a hydroxy group) with tetrafluoroethylene and $CF_2=CF-O-R_f$ and hydrolyzing where necessary to form acid groups; and 3. A membrane followed by polymerizing a perfluorocarbon vinyl ether of the general formula:

$$CF_2=CF-O-(CF_2)_n-X,$$

a perfluorocarbon sulfonyl fluoride of the general formula:

$$FSO_2CFR_gCF_2O(CFYCF_2O)_mCF=CF_2$$

(wherein R$_g$ is fluorine or a perfluoroalkyl group having 1 to 10 carbon atoms; Y is fluorine or a trifluoromethyl group; and m is an integer of 1 to 3) with tetrafluoroethylene and/or $CF_2=CF-O-R_f$, and hydrolyzing where necessary to form acid groups.

Cation exchange membranes of the invention in which the pendant acid groups are physically combined with the base are prepared as follows:

4. A membrane of fluorocarbon polymer, e.g. a homo- or copolymer of such monomers as tetrafluoroethylene, hexafluoropropylene or perfluoromethyl perfluorovinyl ether is coated or impregnated with $CF_2=CF-O-(CF_2)_n-X$, wherein X has the same meaning as in (1) above, polymerizing and, if necessary, hydrolyzing to form the acid;

5. A copolymer membrane made from a perfluorovinyl ether derived monomer which has an LSO$_2$ group convertible to sulfonic acid of the general formula:

$$LSO_2CFR_gCF_2O(CFYCF_2O)_mCF=CF_2$$

(wherein L is OH, fluorine or OA, where A is a quaternary ammonium radical), tetrafluoroethylene and $CF_2=CF-O-R_f$ is impregnated or coated with $CF_2=CF-O-(CF_2)_n-X$, followed by polymerization, and, if necessary, hydrolysis to form the acid;

6. A membrane made from a perfluorovinyl ether derived monomer having a group convertible to a sulfonic acid group and having the general formula $LSO_2CFR_gCF_2O(CFYCF_2O)_mCF=CF_2$, as in (5) above, is impregnated or coated with perfluoroacrylic acid or perfluorocarbonyl fluoride, followed by polymerization, and, if necessary, hydrolysis to form the acid;

7. A fluorocarbon polymer membrane having no ion exchange group is impregnated or coated with a vinyl compound having a COOR group, wherein R is alkyl containing from 1 to 10 carbon atoms, followed by polymerization, and, if necessary, hydrolysis to form the acid; and 8. A membrane made from a perfluorovinyl ether derived monomer of the general formula $LSO_2CFR_gCF_2O(CFYCF_2O)_mCF=CF_2$ as in (5) above, is impregnated or coated with a vinyl compound having a COOR group, as in (7) above, followed by polymerization, and, if necessary, hydrolysis to form the acid.

Among the polymers mentioned in the above, copolymers comprising $CF_2=CF-OR_f$ and $CF_2=CF-O-(CF_2)_n-X$ or $CF_2=CF-COZ$ and the copolymer comprising $CF_2=CF-OR_f$, $CF_2=CF_2$ and $CF_2=CF-O-(CF_2)_n-X$ or $CF_2=CF-COZ$ are preferred because of the ease with which they can be formed into membranes.

When the monomers are impregnated into or coated on the polymer in the preparation of the above membranes, the polymerization may be effected in the presence of a crosslinking agent or a solvent, if desired.

Typical examples of the fluorinated perfluorovinyl ether of the general formula:

$$CF_2=CF-O-(CF_2)_n-X$$

are methyl perfluoro-6-oxa-7-octenoate, methyl perfluoro-5-oxa-6-heptenoate, perfluoro-6-oxa-7-octenoyl fluoride and perfluoro-6-oxa-7-octenenitrile.

Typical examples of an $LSO_2$ group containing perfluorovinyl ether derivative of the general formula:

$$LSO_2CFR_gCF_2O(CFYCF_2O)_mCF=CF_2$$

are the triethylammonium salts of perfluoro[2-(2-fluorosulfonylethoxy)-propylvinyl ether] such as $(C_2H_5)_3HN-O-SO_2CF_2CF_2OCF(CF_3)-CF_2OCF=CF_2$.

Typical examples of the vinyl ether of the general formula:

$$CF_2=CFOR_f$$

are perfluoromethyl perfluorovinyl ethers.

Typical examples of the perfluorocarbon polymer free from COOR groups are homopolymers of tetrafluoroethylene, hexafluoropropene, vinylidene fluoride, perfluoromethyl perfluorovinyl ether, chlorotrifluoroethylene, 1,1,3,3,3-pentafluoropropene and 1,2,3,3,3-pentafluoropropene, alternating copolymers of these monomers and copolymers of these monomers with ethylene.

As crosslinking agents, there may be used fluorinated diolefins of the general formula:

$$CF_2=CF-O-(CF_2CF_2-O)_nCF=CF_2,$$

in addition to such diolefin compounds as, for example, divinylbenzene and butadiene. When a membrane made from a fluorocarbon polymer with pendant sulfonic groups is coated or impregnated with a monomer such as acrylic acid and polymerized in the presence of divinylbenzene, the resulting cation exchange membrane is greatly improved in dimensional stability.

As is clear from the above explanation, the cation exchange membranes of this invention can be prepared by a variety of methods utilizing many different monomers. They may be homopolymers or copolymers, including more than two monomeric units. As is standard in the art, fluorocarbon refers to fluorine containing monomers which may contain hydrogen, chlorine or other atoms attached to carbon atoms, e.g. chlorotrifluoroethylene and vinylidene fluoride. Perfluorocarbons are monomers in which the hydrogens are all replaced with fluorine. For stability, the latter are preferred.

Standard polymerization procedures including solution, emulsion and suspension polymerization may be employed. Polymerization may be initiated by free radical mechanisms or other procedures. The resulting polymer is molded into a membrane according to an ordinary molding procedure such as melt fabrication or the like. The cation exchange membranes may often be prepared directly by casting polymerization techniques. When a fluorocarbon polymer having ion exchange groups is impregnated or coated with acrylic acid or the like monomer having carboxylic groups, and, if desired, with a crosslinking agent and then polymerized, the polymerization may be in the presence of a free radical polymerization catalyst such as a peroxide, by the action of high energy ionizing radiation, or by other means.

Generally, the cation exchange membranes used in this invention will have an exchange capacity, in terms of carboxylic acid groups, of 0.1 to 10 milliequivalents, preferably 0.5 to 4.0 milliequivalents, per gram of dry resin. When sulfonic acid groups are also present in the membranes, the exchange capacity of the sulfonic acid groups is 0.1 to 10 milliequivalents, preferably 0.5 to 4.0 milliequivalents, per gram of dry resin.

The cation exchange membrane used in the present invention may sometimes be reinforced in mechanical strength by incorporating into the membrane a net of fibers of other fluorocarbon polymer. For industrial purposes, the use of a cation exchange membrane, which has been linked with Teflon fibers, is preferable, in general. The thickness of the membrane is 0.01 to 1.5 mm, preferably 0.05 to 1.5 mm, and may be suitably selected so that the specific conductivity and current efficiency of the membrane is such that it may be successfully employed in the electrolysis of sodium chloride in the selected electrolytic cell.

The cation exchange membranes of this invention contain 5 to 50%, based on their own weight, of water in the sodium salt form membrane. The membranes are utilized to divide the electrolytic cell employed into a cathode chamber and an anode chamber. Electrolysis is performed by charging the anode chamber with an aqueous sodium chloride solution, while adding to the cathode chamber water, or a dilute sodium hydroxide solution, which may be recycled to control the concentration of sodium hydroxide at the outlet of the cathode chamber. The concentration of the sodium chloride solution charged to the anode chamber is normally high, preferably near saturation.

The electrolysis may be effected at a temperature of 0° to 150° C., and heat generated due to the electrolysis is removed by cooling a part of the anolyte or catholyte.

In the cathode and anode chambers, there are generated hydrogen and chlorine, respectively. To prevent the membrane from contacting either electrode, a spacer may be interposed between the two. The separation of the gases from the liquids is desirably conducted by providing a free space at the upper portion of each chamber of the electrolytic cell. In this case, it is sometimes desirable that the gases and the effluents be discharged separately, though discharging them together may be effected in the cathode or anode chambers. When separation of gas from liquid is effected in the upper free space within the electric cell, the recycle of the electrolyte in each chamber can advantageously be promoted by the ascending action of the formed gases, in general. This is particularly apparent where the electrolytic cell has been so designed that the formed gases are introduced at the back side of each electrode and are ascending so that the space between the electrode and the membrane surface is gas free. Amongst the advantages of this design are decreased potential depression and lower power consumption.

The perpass electrolysis ratio of sodium chloride charged to the anode chamber may be 3 to 50%. This varies depending on the current density and the manner of heat removal, but is normally maintained as high as possible.

The liquid in each chamber is desirably stirred by means of the gases generated in the cathode and anode chambers, in addition to the flow of externally supplied fluids. For this purpose also, it is desirable that an electrode having many vacant spaces such as a metal mesh electrode is used so that the liquid in each chamber can be moved, circulated and stirred with ascending flow of the gases.

As the cathode, the use of an iron electrode which has been plated with nickel or a nickel compound is preferable, in general, from the standpoint of overpotential. As the anode, the use of a metal mesh or rod electrode which has been coated with an oxide of a noble metal such as ruthenium or the like is preferred. Use of these types of electrodes makes it possible to minimize the interval between membranes and electrodes so that power consumption and potential depression during electrolysis are minimized. By the use of the membranes, back-migration of OH ions is inhibited and the cathode and anode chambers are distinctly separated from each other. Accordingly, when metal electrodes high in mechanical dimensional precision are used in combination with the cation exchange membrane of this invention, the interval between each electrode and the membrane can be made extremely small, e.g. about 1 to 3 mm, so that electrolysis can be effected at a high current density while minimizing the potential depression and while maintaining low power consumption. These characteristics are not observed in the conventional diaphragm process.

Cation exchange membranes of this invention are resistant to chlorine generated in the anode chamber, so that the electrolysis operation can be carried out stably over a long period of time. Additionally, as indicated above, back-migration of hydroxyl ions is inhibited. As a result, the pH of the liquid in the anode chamber can be easily maintained at from neutral to slightly acidic, and thus the content of oxygen in the chlorine generated in the anode chamber can be maintained as low as less than 500 p.p.m.

By utilizing the cation exchange membranes of the invention, current efficiency is far higher than can be achieved with cation exchange membranes prepared from perfluorocarbon polymers with sulfonic acid groups as the only ion exchange groups. The production, in the cathode chamber, of sodium hydroxide at a concentration of more than 20% can be effected with a current efficiency of at least 80%, and about 90 to 98% under optimum conditions. Since the current efficiency is high and the power consumption low, cells using membranes of this invention can be operated economically at current densities as high as 20 to 70 A/dm$^2$. A principal reason contributing to the high current efficiency is the inhibition of back-migration of OH ions.

The aqueous sodium chloride solution charged to the anode chamber is purified, as in conventional sodium chloride electrolysis processes. It may be subjected to the dechlorination, dissolution and saturation of sodium chloride, precipitation and separation of magnesium, calcium, iron, etc., and neutralization, as in other procedures. It may also be desirable to further purify the feed sodium chloride solution with a granular ion exchange resin, particularly a chelate resin, to reduce the calcium content thereof to an acceptable limit, preferably to less than 1 p.p.m.

While this invention should not be limited by theory, it appears possible that the advantages of this invention are attained because of the low dissociation constant of carboxylic acid groups. As a result of the low dissociation constant, the carboxyl groups in the membrane in contact with the anolyte having a high hydrogen ion concentration exist in the hydrogen form, which makes the membrane structure more compact and effectively inhibits the back-migration of hydroxyl ions. This effect cannot be achieved with membranes in which the only pendant groups are sulfonic acid groups.

The following non-limiting examples are given by way of illustration only.

EXAMPLE 1

A copolymer of perfluoro[2-(2-fluorosulfonylethoxy)propylvinyl ether] with tetrafluoroethylene was molded into a membrane 0.12 mm in thickness, which was then hydrolyzed to prepare a cation exchange membrane having an exchange capacity, in terms of sulfonic acid groups, of 0.88 milliequivalent/gram dry resin.

This perfluorosulfonic acid type cation exchange membrane was impregnated with a solution of perfluoroacrylic acid, and the latter was then polymerized to obtain a perfluorovinyl ether type cation exchange membrane, in which the perfluoroacrylic acid polymer was present in admixture with the perfluorosulfonic acid type polymer.

This cation exchange membrane contained 0.75 milliequivalent/gram dry resin of sulfonic acid groups, and 1.1 milliequivalents/gram dry resin of carboxylic acid groups.

This cation exchange membrane, which had an effective area of 100 dm$^2$, was used to divide an electrolytic cell into a cathode chamber and an anode chamber. Fifty units of such electrolytic cell were arranged in series so that the respective adjacent electrodes formed a bipolar system comprising 50 electrolytic cells.

Using the thus prepared electrolytic cell assembly, electrolysis was conducted by charging 305 g/l of an aqueous sodium chloride solution to each cell through the inlet of the anode chamber, and an aqueous sodium hydroxide solution was recycled while being controlled at a concentration of 35.5% by adding water to the outlet of the cathode chamber. The electrolysis was carried out while applying a current of 5,000 amperes to the chambers in series.

In this case, the amount of the solution charged to the anode chamber was controlled to 11.515 kl/hr, water was added to the outlet of the cathode chamber, and the aqueous sodium hydroxide solution at the outlet of the cathode chamber was recycled. The current efficiency of the sodium hydroxide recovered from the outlet of the cathode chamber was 95.8%.

COMPARISON EXAMPLE 1

A copolymer of perfluoro[2-(2-fluorosulfonylethoxy)propylvinyl ether] with tetrafluoroethylene was molded into a membrane 0.12 mm in thickness, which was then hydrolyzed to prepare a cation exchange membrane containing 0.90 milliequivalent/gram dry resin of sulfonic acid groups.

This membrane was utilized in the same manner as in Example 1, but the current efficiency while producing sodium hydroxide of 35.1% concentration was only 55.7%, and the amount of NaCl in the NaOH was 2,000 p.p.m. Further, the specific electric conductivity of the membrane was 11.3 mmho/cm as measured in a 0.1 N aqueous NaOH solution at 25° C.

The specific electric conductivity of the membrane was measured in the following manner.

The membrane was completely brought into the —SO$_3$Na form and then equilibrated by dipping at normal temperature for 10 hours in a 0.1 N aqueous NaOH solution which is supplied continuously. Subsequently, the electric resistivity of the membrane was measured in the solution by applying an alternating current of 1,000 cycles, while maintaining the solution at 25° C., and the specific electric conductivity was calculated from the thickness and the effective area of the membrane.

COMPARISON EXAMPLE 2

The same copolymer as in Comparison Example 1 was molded into a membrane 0.12 mm in thickness, and then hydrolyzed to prepare a cation exchange membrane containing 0.65 milliequivalent/gram dry resin of sulfonic acid groups.

Using this membrane, electrolysis was conducted in the same manner as in Example 1, but the current efficiency while producing sodium hydroxide of 35.1% concentration was only 73%. The specific electric conductivity of the membrane was 4.5 mmho/cm as measured in a 0.1 N aqueous NaOH solution at 25° C.

EXAMPLE 2

The membrane of Comparison Example 1 was impregnated with methyl perfluoro-5-oxa-6-heptenoate, which was then polymerized and was hydrolyzed to prepare a cation exchange membrane having an exchange capacity, in terms of sulfonic acid groups, of 0.77 milliequivalent/gram dry resin, and an exchange capacity, in terms of carboxylic acid groups, of 0.42 milliequivalent/gram dry resin.

Using this cation exchange membrane, electrolysis was conducted in the same manner as in Example 1. The current efficiency for producing sodium hydroxide of 35.0% concentration was 96.2%. The amount of NaCl in the NaOH was only 150 p.p.m. Further, the specific electric conductivity of the membrane was 13.2 mmho/cm, and the cell voltage did not differ from that in Comparison Example 1.

EXAMPLE 3

A 2,3-dichloro-perfluorobutane solution of a ternary copolymer of $CF_2=CFO(CF_2)_4COOCH_3$, $CF_2=CFOCF_3$ and tetrafluoroethylene was coated on one side of the membrane of Comparison Example 1. After evaporating the solvent, the membrane was hot-pressed and then hydrolyzed to prepare a cation exchange membrane having a coating of 0.01 mm in thickness. The thus prepared cation exchange membrane contained 0.83 milliequivalent/gram dry resin of sulfonic acid groups and 0.05 milliequivalent/gram dry resin of carboxylic acid groups.

Using this membrane, electrolysis was conducted in the same manner as in Example 1, while facing the coated side of the membrane to the cathode. The current efficiency for producing sodium hydroxide of 35.5% concentration was 97.1%.

EXAMPLE 4

A ternary copolymer comprising perfluoro[2-(2-fluorosulfonylethoxy)-propylvinyl ether], tetrafluoroethylene and perfluoro-6-oxa-7-octenoyl fluoride was molded into a membrane of 0.12 mm in thickness, which was then hydrolyzed to prepare a cation exchange membrane containing 0.43 milliequivalent/gram dry resin of sulfonic acid groups and 0.70 milliequivalent/gram dry resin of carboxylic acid groups.

Using 50 sheets of this cation exchange membrane which had an effective area of 100 dm$^2$, electrolysis was conducted in the same manner and by use of the same apparatus as in Example 1, while applying a current of 5,000 amperes to the 50 electrolytic cell units in series. The current efficiency for producing sodium hydroxide of 35.6% concentration was 98.8%, and the specific electric conductivity of the membrane was 9.0 mmho/cm.

EXAMPLE 5

A quaternary copolymer comprising perfluoro[2-(2-fluorosulfonylethoxy)-propylvinyl ether], tetrafluoroethylene, perfluoro-5-oxa-6-heptenoyl fluoride and perfluoropropyl perfluorovinyl ether was molded into a membrane 0.12 mm in thickness. After reinforcing with a Teflon fiber, the membrane was hydrolyzed to prepare a cation-exchange membrane containing 0.84 milliequivalent/gram dry resin of sulfonic acid groups and 1.20 milliequivalents/gram dry resin of carboxylic acid groups.

Using this cation-exchange membrane, electrolysis was conducted in the same manner as in Example 1. The current efficiency for producing sodium hydroxide of 36.0% concentration was 98.4%.

EXAMPLE 6

A cation exchange membrane was prepared by molding a ternary polymer comprising perfluoro[2-(2-fluorosulfonylethoxy)propylvinyl ether], tetrafluoroethylene and methyl perfluoro-6-oxa-7-octenoate into a membrane reinforced with a reticular material composed of Teflon, followed by hydrolysis.

This cation exchange membrane had 0.71 milliequivalent/gram dry resin of sulfonic acid groups and 1.5 milliequivalents/gram dry resin of carboxylic acid groups.

Using 50 sheets of this cation exchange membrane which had an effective area of 100 dm$^2$, electrolysis was conducted in the same manner and by use of the same electrolytic cell assembly as in Example 1, except that 305 g/l of an aqueous sodium chloride solution was recycled in the anode chamber at a rate of 12.820 kl/hr, and water was continuously poured to the exit solution of the cathode chamber so that the concentration of sodium hydroxide in said exit solution was maintained at 31.1%. The amount of the water was controlled to 767.65 kg/hr, and the electrolysis was carried out while applying a current of 5,000 amperes to the 50 electrolytic cell units in series. The amount of chlorine generated in the anode chamber was 311.2 kg/hr, the amount of 31.1% sodium hydroxide solution recovered from the cathode chamber was 1,127.4 kg/hr, and the amount of hydrogen recovered from the cathode chamber was 9,325 g/hr. The current efficiency was 94%.

What is claimed is:

1. A process for the electrolysis of an aqueous sodium chloride solution which comprises passing an electric current through said solution in an electrolytic cell separated into an anode chamber and a cathode chamber by a cation exchange membrane consisting essentially of perfluorocarbon polymer having pendant carboxylic acid and sulfonic acid groups, the ion exchange capacity of sulfonic and carboxylic acid groups being from 0.5 to 2.21 milliequivalents per gram of dry resin, the ratio of carboxylic acid groups to sulfonic acid groups being in the range of from 1:100 to 100:1.

2. The process of claim 1, wherein the ion exchange capacity of the carboxylic acid groups in said membrane is at least 0.005 milliequivalent per gram of dry resin.

3. The process of claim 1, wherein the perfluorocarbon polymer having pendant carboxylic acid groups is present on the surface of the membrane.

4. The process of claim 1, wherein a perfluorocarbon polymer having pendant carboxylic acid groups is present on one surface of the membrane.

5. The process of claim 1, wherein a perfluorocarbon polymer having pendant carboxylic acid groups is present, together with a perfluorocarbon polymer having pendant sulfonic acid groups, on one surface of the membrane.

6. The process of claim 5, wherein a perfluorocarbon polymer having pendant sulfonic acid groups is present on another surface of the membrane.

7. The process of claim 1, wherein the membrane in the sodium salt form has a water content of from 5 to 50% by weight.

8. The process of claim 1, wherein said membrane comprises a physical combination of perfluorocarbon polymer having pendant carboxylic acid groups with perfluorocarbon polymer having pendant sulfonic acid groups.

9. The process of claim 1, wherein the cation exchange membrane is fiber reinforced.

10. The process of claim 1, wherein said perfluorocarbon polymer is a copolymer of at least one of tetrafluoroethylene and $CF_2=CF-O-R_f$ wherein $R_f$ is a perfluorinated alkyl group containing 1 to 3 carbon atoms with perfluorocarbon vinyl monomers containing carboxylic acid groups and sulfonic acid groups or functional groups which can be converted to carboxylic acid or sulfonic acid groups.

11. The process of claim 1, wherein said perfluorocarbon polymer is a copolymer of a perfluorocarbon vinyl monomer having the general formula:

$$CF_2=CF-O-(CF_2)_n-X$$

wherein n is an integer of 2 to 12, and X is CN, COF, COOH, COOR, COOM or $CONR_2R_3$ where R is an alkyl group containing 1 to 10 carbon atoms, $R_2$ and $R_3$ are individually hydrogen or an alkyl group containing 1 to 10 carbon atoms, and M is sodium, potassium or cesium; and a perfluorocarbon sulfonyl fluoride having the general formula:

$$F-SO_2-CFR_g-CF_2-O(CFYCF_2O)_m-CF=CF_2$$

wherein $R_g$ is fluorine or a perfluoroalkyl group having 1 to 10 carbon atoms, Y is fluorine or a trifluoromethyl group, and m is an integer of 1 to 3, with at least one of tetrafluoroethylene and $CF_2=CF-O-R_f$ wherein $R_f$ is a perfluorinated alkyl group containing 1 to 3 carbon atoms, which copolymer is hydrolyzed, if necessary, to form said acid groups.

12. The process of claim 1, wherein said perfluorocarbon polymer is a copolymer of a perfluoroacrylic acid having the general formula:

$$CF_2=CF-COZ$$

wherein Z is fluorine, an alkoxy group containing 1 to 10 carbon atoms, amino or hydroxy; and a perfluorocarbon sulfonyl fluoride having the general formula:

$$F-SO_2-CFR_g-O(CFYCF_2O)_m-CF=CF_2$$

wherein $R_g$ is fluorine or a perfluoroalkyl group having 1 to 10 carbon atoms, Y is fluorine or a trifluoromethyl group, and m is an integer of 1 to 3, with at least one of tetrafluoroethylene and $CF_2=CF-O-R_f$ wherein $R_f$ is a perfluorinated alkyl group containing 1 to 3 carbon atoms, which copolymer is hydrolyzed, if necessary, to form said acid groups.

13. The process of claim 1, wherein said cation exchange membrane is prepared by impregnating or coating a membrane of a copolymer of (A) a perfluorovinyl ether having the general formula:

$$LSO_2CFR_gCF_2O(CFYCF_2O)_m-CF=CF_2$$

wherein L is hydroxy, fluorine or OA, where A is a quaternary ammonium radical; $R_g$ is fluorine or a perfluoroalkyl group having 1 to 10 carbon atoms; Y is fluorine or a trifluoromethyl group; and m is an integer of 1 to 3, and (B) at least one of tetrafluoroethylene and $CF_2=CFOR_f$ wherein $R_f$ is a perfluorinated alkyl group containing 1 to 3 carbon atoms, with a perfluorovinyl compound having pendant carboxylic acid groups or derivatives thereof, polymerizing said impregnated or coated vinyl compound, and hydrolyzing, if necessary, to form said acid groups.

14. The process of claim 13, wherein said perfluorovinyl compound is at least one member selected from the group consisting of compounds having the formula:

$$CF_2=CF-O-(CF_2)_n-X$$

wherein n is an integer of 2 to 12, and X is CN, COF, COOH, COOR, COOM or $CONR_2R_3$, where R is an alkyl group containing 1 to 10 carbon atoms, $R_2$ and $R_3$ are individually hydrogen or an alkyl group containing 1 to 10 carbon atoms, and M is sodium, potassium or cesium, and compounds having the formula:

$$CF_2=CF-COZ$$

wherein Z is fluorine or an alkoxy group containing 1 to 10 carbon atoms.

15. The process of claim 1, wherein said cation exchange membrane is prepared by impregnating or coating a membrane of a copolymer of (A) a perfluorovinyl ether having the general formula:

$$LSO_2CFR_gCF_2O(CFYCF_2O)_m-CF=CF_2$$

wherein L is hydroxy, fluorine or OA, where A is a quaternary ammonium radical; $R_g$ is fluorine or a perfluoroalkyl group having 1 to 10 carbon atoms; Y is fluorine or a trifluoromethyl group; and m is an integer of 1 to 3, and (B) at least one of tetrafluoroethylene and $CF_2=CFOR_f$ wherein $R_f$ is a perfluorinated alkyl group containing 1 to 3 carbon atoms, with a solution of a perfluorocarbon polymer having pendant carboxylic acid groups or derivatives thereof, and hydrolyzing, if necessary, to form said acid groups.

16. A process according to claim 13, 14 or 15, wherein the impregnating or coating is conducted on one surface of the membrane.

17. The process of claim 4, wherein said carboxylic acid groups are contained predominantly on said one surface of the membrane and wherein the membrane is disposed in said electrolytic cell such that said surface having the pendant carboxylic acid groups faces the cathode side of the cell.

18. A process according to claim 10, 11, 12, 13, 14 or 15, wherein the cation exchange membrane is fiber reinforced.

19. The process of claim 1, wherein the thickness of the membrane is 0.05 to 1.5 mm.

20. The process of claim 1, wherein the electrolysis is conducted at a temperature of 0° to 150° C. while charging an aqueous sodium chloride solution into the anode chamber and adding water or an aqueous dilute sodium hydroxide solution into the cathode chamber to adjust the concentration of sodium hydroxide to more than 20%.

21. The process of claim 1, wherein the membrane has an ion exchange capacity of sulfonic and carboxylic acid groups of from about 0.88 to about 2.21 milliequivalents per gram of dry resin.

22. A process for the electrolysis of an aqueous sodium chloride solution which comprises passing an electric current through said solution in an electrolytic cell separated into an anode chamber and a cathode chamber by a cation exchange membrane at a temperature of 0° to 150° C. while charging an aqueous sodium chloride solution which has been purified to a calcium content of less than 1 p.p.m. into the anode chamber and adding water or an aqueous dilute sodium hydroxide solution into the cathode chamber to adjust the concentration of sodium hydroxide therein to more than 20%, said membrane consisting essentially of perfluorocarbon polymer having pendant carboxylic acid and sulfonic acid groups, the ion exchange capacity of sulfonic and carboxylic acid groups being from 0.5 to 2.21 milliequivalents per gram of dry resin, the ratio of carboxylic acid groups to sulfonic acid groups being in the range of from 1:100 to 100:1.

23. The process of claim 22, wherein the aqueous sodium chloride solution charged into the anode chamber is purified by ion exchange.

24. The process of claim 22, wherein the membrane has a ion exchange capacity of sulfonic and carboxylic acid groups of from about 0.88 to about 2.21 milliequivalents per gram of dry resin.

25. A cation exchange membrane suitable for use in the electrolysis of an aqueous sodium chloride solution consisting essentially of perfluorocarbon polymer having pendant carboxylic acid and sulfonic acid groups, the ion exchange capacity of sulfonic and carboxylic acid groups being from 0.5 to 2.21 milliequivalents per gram of dry resin, the ratio of carboxylic acid groups to sulfonic acid groups being in the range of 1:100 to 100:1.

26. A cation exchange membrane in accordance with claim 25, wherein the ion exchange capacity of the carboxylic acid groups in said membrane is at least 0.005 milliequivalent per gram of dry resin.

27. A cation exchange membrane in accordance with claim 25, wherein a perfluorocarbon polymer having pendant carboxylic acid groups is present on the surface of the membrane.

28. A cation exchange membrane in accordance with claim 25, wherein a perfluorocarbon polymer having pendant carboxylic acid groups is present on one surface of the membrane.

29. A cation exchange membrane in accordance with claim 25, wherein a perfluorocarbon polymer having pendant carboxylic acid groups is present, together with a perfluorocarbon polymer having pendant sulfonic acid groups, on one surface of the membrane.

30. A cation exchange membrane in accordance with claim 29, wherein a perfluorocarbon polymer having pendant sulfonic acid groups is present on another surface of the membrane.

31. A cation exchange membrane in accordance with claim 25, which has a water content in the sodium salt form of from 5 to 50% by weight.

32. A cation exchange membrane in accordance with claim 25, which comprises a physical combination of perfluorocarbon polymer having pendant carboxylic acid groups with perfluorocarbon polymer having pendant sulfonic acid groups.

33. A cation exchange membrane in accordance with claim 25, which includes a fiber reinforcement.

34. A cation exchange membrane in accordance with claim 25, wherein said perfluorocarbon polymer is a copolymer of at least one of tetrafluoroethylene and $CF_2\!=\!CF\!-\!O\!-\!R_f$ wherein $R_f$ is a perfluorinated alkyl group containing 1 to 3 carbon atoms with perfluorocarbon vinyl monomers containing carboxylic acid groups and sulfonic acid groups or functional groups which can be converted to carboxylic acid or sulfonic acid groups.

35. A cation exchange membrane in accordance with claim 25, wherein said perfluorocarbon polymer is a copolymer of a perfluorocarbon vinyl monomer having the general formula:

$$CF_2\!=\!CF\!-\!O\!-\!(CF_2)_n\!-\!X$$

wherein n is an integer of 2 to 12, and X is CN, COF, COOH, COOR, COOM or $CONR_2R_3$, where R is an alkyl group containing 1 to 10 carbon atoms, $R_2$ and $R_3$ are individually hydrogen or an alkyl group containing 1 to 10 carbon atoms, and M is sodium, potassium or cesium; and a perfluorocarbon sulfonyl fluoride having the general formula:

$$F\!-\!SO_2\!-\!CFR_g\!-\!CF_2\!-\!O(CFYCF_2O)\text{-}_m\!-\!CF\!=\!CF_2$$

wherein $R_g$ is fluorine or a perfluoroalkyl group having 1 to 10 carbon atoms, Y is fluorine or a trifluoromethyl group, and m is an integer of 1 to 3, with at least one of tetrafluoroethylene and $CF_2\!=\!CF\!-\!O\!-\!R_f$ wherein $R_f$ is a perfluorinated alkyl group containing 1 to 3 carbon atoms, which copolymer is hydrolyzed, if necessary, to form said acid groups.

36. A cation exchange membrane in accordance with claim 25, wherein said perfluorocarbon polymer is a copolymer of a perfluoroacrylic acid having the general formula:

$$CF_2\!=\!CF\!-\!COZ$$

wherein Z is fluorine, an alkoxy group containing 1 to 10 carbon atoms, amino or hydroxy; and a perfluorocarbon sulfonyl fluoride having the general formula:

$$F\!-\!SO_2\!-\!CFR_g\!-\!CF_2\!-\!O(CFYCF_2O)\text{-}_m\!-\!CF\!=\!CF_2$$

wherein $R_g$ is fluorine or a perfluoroalkyl group having 1 to 10 carbon atoms, Y is fluorine or a trifluoromethyl group, and m is an integer of 1 to 3, with at least one tetrafluoroethylene and $CF_2\!=\!CF\!-\!O\!-\!R_f$ wherein $R_f$ is a perfluorinated alkyl group containing 1 to 3 carbon atoms, which copolymer is hydrolyzed, if necessary, to form said acid groups.

37. A cation exchange membrane in accordance with claim 25, wherein said cation exchange membrane is prepared by impregnating or coating a membrane of a copolymer of (A) a perfluorovinyl ether having the general formula:

$$LSO_2CFR_gCF_2O(CFYCF_2O)_m-CF=CF_2$$

wherein L is hydroxy, fluorine or OA, where A is a quaternary ammonium radical; $R_g$ is fluorine or a perfluoroalkyl group having 1 to 10 carbon atoms; Y is fluorine or a trifluoromethyl group; and m is an integer of 1 to 3, and (B) at least one of tetrafluoroethylene and $CF_2=CFOR_f$ wherein $R_f$ is a perfluorinated alkyl group containing 1 to 3 carbon atoms, with a perfluorovinyl compound having pendant carboxylic acid groups or derivatives thereof, polymerizing said impregnated or coated vinyl compound, and hydrolyzing, if necessary, to form said acid groups.

38. A cation exchange membrane in accordance with claim 37, wherein said perfluorovinyl compound is at least one member selected from the group consisting of compounds having the formula:

$$CF_2=CF-O-(CF_2)_n-X$$

wherein n is an integer of 2 to 12, and X is CN, COF, COOH, COOR, COOM or $CONR_2R_3$, where R is an alkyl group containing 1 to 10 carbon atoms, $R_2$ and $R_3$ are individually hydrogen or an alkyl group containing 1 to 10 carbon atoms, and M is sodium, potassium or cesium, and compounds having the formula:

$$CF_2=CF-COZ$$

wherein Z is fluorine or an alkoxy group containing 1 to 10 carbom atoms.

39. A cation exchange membrane in accordance with claim 25, wherein said cation exchange membrane is prepared by impregnating or coating a membrane of a copolymer of (A) a perfluorovinyl ether having the general formula:

$$LSO_2CFR_gCF_2O(CFYCF_2O)_m-CF=CF_2$$

wherein L is hydroxy, fluorine or OA, where A is a quaternary ammonium radical; $R_g$ is fluorine or a perfluoroalkyl group having 1 to 10 carbon atoms; Y is fluorine or a trifluoromethyl group; and m is an integer of 1 to 3, and (B) at least one of tetrafluoroethylene and $CF_2=CFOR_f$ wherein $R_f$ is a perfluorinated alkyl group containing 1 to 3 carbon atoms, with a solution of a perfluorocarbon polymer having pendant carboxylic acid groups or derivatives thereof, and hydrolyzing, if necessary, to form said acid groups.

40. A cation exchange membrane in accordance with claim 37, 38 or 39, wherein the impregnating or coating is conducted on one surface of the membrane.

41. A cation exchange membrane in accordance with claim 25, wherein the thickness of the membrane is 0.05 to 1.5 mm.

42. A cation exchange membrane in accordance with claim 25, wherein the ion exchange capacity of sulfonic and carboxylic acid groups is from about 0.88 to about 2.21 milliequivalents per gram of dry resin.

43. An electrolytic cell comprising an anode chamber and a cathode chamber separated by a cation exchange membrane which is suitable for the production of aqueous sodium hydroxide in the cathode chamber wherein an aqueous solution of sodium chloride is charged into the anode chamber, said membrane consisting essentially of perfluorocarbon polymer having pendant carboxylic acid and sulfonic acid groups, said membrane having an ion exchange capacity of sulfonic and carboxylic acid groups of from 0.5 to 2.21 milliequivalents per gram of dry resin, the ratio of carboxylic acid groups to sulfonic acid groups being in the range of 1:100 to 100:1.

44. An electrolytic cell in accordance with claim 43, wherein the ion exchange capacity of the carboxylic acid groups in said membrane is at least 0.005 milliequivalent per gram of dry resin.

45. An electrolytic cell in accordance with claim 43, wherein a perfluorocarbon polymer having pendant carboxylic acid groups is present on the surface of the membrane.

46. An electrolytic cell in accordance with claim 43, wherein a perfluorocarbon polymer having pendant carboxylic acid groups is present on one surface of the membrane.

47. An electrolytic cell in accordance with claim 43, wherein a perfluorocarbon polymer having pendant carboxylic acid groups is present, together with a perfluorocarbon polymer having pendant sulfonic acid groups, on one surface of the membrane.

48. An electrolytic cell in accordance with claim 47, wherein a perfluorocarbon polymer having pendant sulfonic acid groups is present on another surface of the membrane.

49. An electrolytic cell in accordance with claim 43, wherein the membrane in the sodium salt form has a water content of from 5 to 50% by weight.

50. An electrolytic cell in accordance with claim 43, wherein the membrane comprises a physical combination of perfluorocarbon polymer having pendant carboxylic acid groups with perfluorocarbon polymer having pendant sulfonic acid groups.

51. An electrolytic cell in accordance with claim 43, wherein the cation exchange membrane is fiber reinforced.

52. An electrolytic cell in accordance with claim 43, wherein said perfluorocarbon polymer is a copolymer of at least one of tetrafluoroethylene and $CF_2=CF-O-R_f$ wherein $R_f$ is a perfluorinated alkyl group containing 1 to 3 carbon atoms with perfluorocarbon vinyl monomers containing carboxylic acid groups and sulfonic acid groups or functional groups which can be converted to carboxylic acid or sulfonic acid groups.

53. An electrolytic cell in accordance with claim 43, wherein said perfluorocarbon polymer is a copolymer of perfluorocarbon vinyl monomer having the general formula:

$$CF_2=CF-O-(CF_2)_n-X$$

wherein n is an integer of 2 to 12, and X is CN, COF, COOH, COOR, COOM or $CONR_2R_3$ where R is an alkyl group containing 1 to 10 carbon atoms, $R_2$ and $R_3$ are individually hydrogen or an alkyl group containing 1 to 10 carbon atoms, and M is sodium, potassium or cesium; and a perfluorocarbon sulfonyl fluoride having the general formula:

$$F-SO_2-CFR_g-CF_2-O(CFYCF_2O)_m-CF=CF_2$$

wherein $R_g$ is fluorine or a perfluoroalkyl group having 1 to 10 carbon atoms, Y is fluorine or a trifluoromethyl group, and m is an integer of 1 to 3, with at least one of tetrafluoroethylene and $CF_2=CF-O-R_f$ wherein $R_f$ is a perfluorinated alkyl group containing 1 to 3 carbon atoms, which copolymer is hydrolyzed, if necessary, to form said acid groups.

54. An electrolytic cell in accordance with claim 43, wherein said perfluorocarbon polymer is a copolymer of a perfluoroacrylic acid having the general formula:

$$CF_2=CF-COZ$$

wherein Z is fluorine, an alkoxy group containing 1 to 10 carbon atoms, amino or hydroxy; and a perfluorocarbon sulfonyl fluoride having the general formula:

$$F-SO_2-CFR_g-CF_2-O(CFYCF_2O)_m-CF=CF_2$$

wherein $R_g$ is fluorine or a perfluoroalkyl group having 1 to 10 carbon atoms, Y is fluorine or a trifluoromethyl group, and m is an integer of 1 to 3, with at least one of tetrafluoroethylene and $CF_2=CF-O-R_f$ wherein $R_f$ is a perfluorinated alkyl group containing 1 to 3 carbon atoms, and hydrolyzing, if necessary, to form said acid groups.

55. An electrolytic cell in accordance with claim 43, wherein said cation exchange membrane is prepared by impregnating or coating a membrane of a copolymer of (A) a perfluorovinyl ether having the general formula:

$$LSO_2CFR_gCF_2O(CFYCF_2O)_m-CF=CF_2$$

wherein L is hydroxy, fluorine or OA, where A is a quaternary ammonium radical; $R_g$ is fluorine or a perfluoroalkyl group having 1 to 10 carbon atoms; Y is fluorine or a trifluoromethyl group; and m is an integer of 1 to 3, and (B) at least one of tetrafluoroethylene and $CF_2=CFOR_f$ wherein $R_f$ is a perfluorinated alkyl group containing 1 to 3 carbon atoms, with a perfluorovinyl compound having pendant carboxylic acid groups or derivatives thereof, polymerizing said impregnated or coated vinyl compound, and hydrolyzing, if necessary, to form said acid groups.

56. An electrolytic cell in accordance with claim 55, wherein said perfluorovinyl compound is at least one member selected from the group consisting of compounds having the formula:

$$CF_2=CF-O-(CF_2)_n-X$$

wherein n is an integer of 2 to 12, and X is CN, COF, COOH, COOR, COOM or $CONR_2R_3$, where R is an alkyl group containing 1 to 10 carbon atoms, $R_2$ and $R_3$ are individually hydrogen or an alkyl group containing 1 to 10 carbon atoms, and M is sodium, potassium or cesium, and compounds having the formula:

$$CF_2=CF-COZ$$

wherein Z is fluorine or an alkoxy group containing 1 to 10 carbon atoms.

57. An electrolytic cell in accordance with claim 43, wherein said cation exchange membrane is prepared by impregnating or coating a membrane of a copolymer of (A) a perfluorovinyl ether having the general formula:

$$LSO_2CFR_gCF_2O(CFYCF_2O)_m-CF=CF_2$$

wherein L is hydroxy, fluorine or OA, where A is a quaternary ammonium radical; $R_g$ is fluorine or a perfluoroalkyl group having 1 to 10 carbon atoms; Y is fluorine or a trifluoromethyl group; and m is an integer of 1 to 3, and (B) at least one of tetrafluoroethylene and $CF_2=CFOR_f$ wherein $R_f$ is a perfluorinated alkyl group containing 1 to 3 carbon atoms, with a solution of a perfluorocarbon polymer having pendant carboxylic acid groups or derivatives thereof, and hydrolyzing, if necessary, to form said acid groups.

58. An electrolytic cell in accordance with claim 55, 56 or 57, wherein the impregnating or coating is conducted on one surface of the membrane.

59. An electrolytic cell in accordance with claim 46, wherein said carboxylic acid groups are cotained predominantly on said one surface of the membrane and wherein the membrane is disposed in said electrolytic cell such that said surface having the pendant carboxylic acid groups faces the cathode side of the cell.

60. An electrolytic cell in accordance with claim 43, wherein the thickness of the membrane is 0.05 to 1.5 mm.

61. An electrolytic cell in accordance with claim 43, wherein the membrane has an ion exchange capacity of sulfonic and carboxylic acid groups of from about 0.88 to about 2.21 milliequivalents per gram of dry resin.

62. The process of claim 1, wherein the electrolysis is conducted with a current efficiency of greater than 90% at a concentration of sodium hydroxide of more than 20%.

63. A process for the electrolysis of an aqueous sodium chloride solution with high current efficiency at high concentrations of sodium hydroxide which comprises passing an electric current through said solution in an electrolytic cell separated into an anode chamber and a cathode chamber by a cation exchange membrane consisting essentially of perfluorocarbon polymer having pendant carboxylic acid and sulfonic acid groups, the ion exchange capacity of sulfonic and carboxylic acid groups being from 0.5 to 2.21 milliequivalents per gram of dry resin.

64. The process of claim 63, wherein the electrolysis is conducted with a current efficiency of greater than 90% at a concentration of sodium hydroxide of more than 20%.

65. A cation exchange membrane suitable for use in the electrolysis of an aqueous sodium chloride solution consisting essentially of perfluorocarbon polymer having pendant carboxylic acid and sulfonic acid groups, the ion exchange capacity of sulfonic and carboxylic acid groups being from 0.5 to 2.21 milliequivalents per gram of dry resin, said membrane providing high current efficiency at high concentrations of sodium hydroxide.

66. A cation exchange membrane in accordance with claim 65, wherein said membrane is capable of providing a current efficiency of greater than 90% at a concentration of sodium hydroxide of more than 20%.

67. An electrolytic cell comprising an anode chamber and a cathode chamber separated by a cation exchange membrane which is suitable for the production of aqueous sodium hydroxide in the cathode chamber wherein an aqueous solution of sodium chloride is charged into the anode chamber, said membrane consisting essentially of perfluorocarbon polymer having pendant carboxylic acid and sulfonic acid groups, said membrane having an ion exchange capacity of sulfonic and carboxylic acid groups of from 0.5 to 2.21 milliequivalents per gram of dry resin, said membrane providing high current efficiency at high concentrations of sodium hydroxide.

68. An electrolytic cell in accordance with claim 67, wherein said membrane is capable of providing a current efficiency of greater than 90% at a concentration of sodium hydroxide of more than 20%.

* * * * *